United States Patent [19]
Pimsleur

[11] 3,813,017
[45] May 28, 1974

[54] CAMERA HOLSTER

[76] Inventor: Joel L. Pimsleur, 2872 Washington St., San Francisco, Calif. 94115

[22] Filed: Feb. 22, 1972

[21] Appl. No.: 228,203

[52] U.S. Cl............. 224/26 R, 150/52 J, 229/16 R
[51] Int. Cl............................................ A45c 11/38
[58] Field of Search ......... 224/26 R, 26 B, 2 B, 19; 150/52 J; 206/37 R, 38 R, 41 D, 41.2 B; 229/16 R, 37 R, 45

[56] References Cited
UNITED STATES PATENTS

| | | | |
|---|---|---|---|
| 2,308,003 | 1/1943 | Gamrod | 224/26 B |
| 2,547,620 | 4/1951 | Capano | 224/26 R |
| 2,700,492 | 1/1955 | Baetzing | 224/26 R |
| 3,125,277 | 3/1964 | Kozlowski | 229/45 |
| 3,127,076 | 3/1964 | Tebbs | 224/19 |
| 3,520,241 | 7/1970 | Caldwell | 224/26 R |

FOREIGN PATENTS OR APPLICATIONS

| | | | |
|---|---|---|---|
| 985,184 | 3/1965 | Great Britain | 150/52 J |

Primary Examiner—Robert J. Spar
Assistant Examiner—Kenneth Noland
Attorney, Agent, or Firm—Fitch, Even, Tabin & Luedeka

[57] ABSTRACT

A camera holster is described in which the various panels are formed contiguously from a unitary piece of flexible material. A top cover extends over the top of the holster and a flap foldably extends downwardly from the top cover and releasably attaches to the front panel. Loop means are provided at the back panel for supporting the camera holster on a belt.

2 Claims, 5 Drawing Figures

3,813,017
SHEET 1 OF 2
FIG. 2.
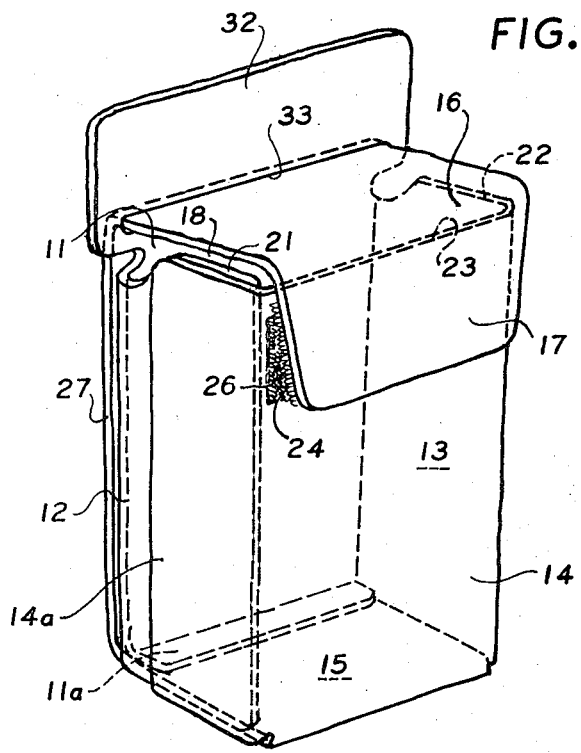
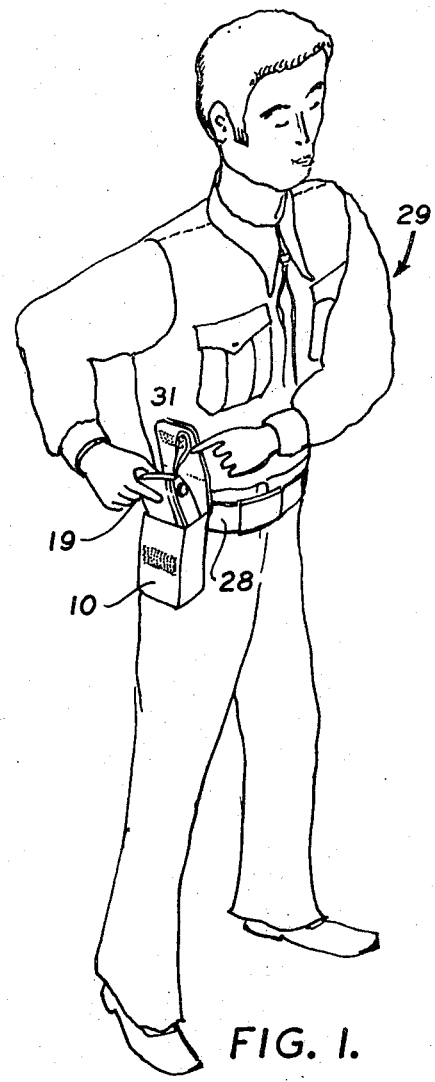
FIG. 1.
FIG. 3.
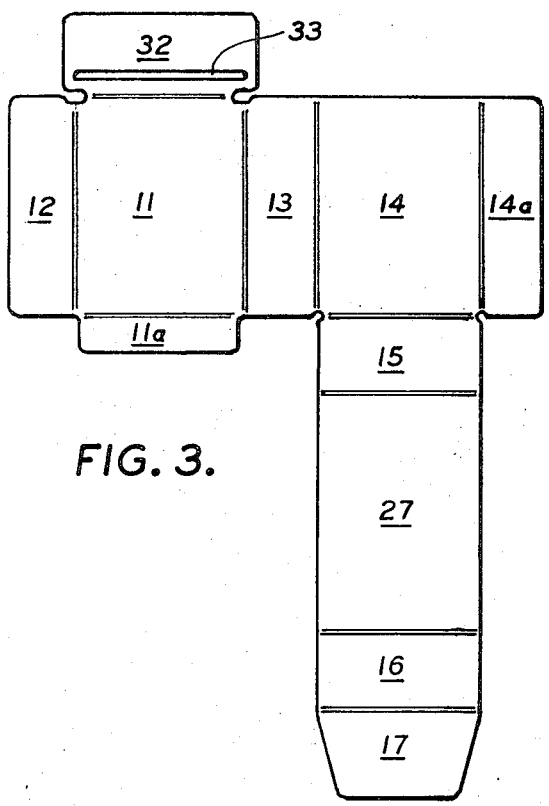

PATENTED MAY 28 1974 3,813,017

CAMERA HOLSTER

This invention relates generally to means for carrying cameras and, more particularly, to a camera holster.

Various means for carrying cameras have been developed to provide protection and support for the camera while it is not in use. Often such camera cases are designed to carry camera accessories in addition to the camera itself, and therefore tend to be bulky and inconvenient to use. Even relatively small camera cases, however, have often been inconvenient to use in the sense they are difficult to open and dangle awkwardly from various types of carrying strap arrangements. In addition to problems associated with bulk or inconvenience of use, many prior art camera cases have been extremely expensive to manufacture because of relatively elaborate sewing operations needed to form the vinyl or leather pieces from which they are made into a receptacle of the appropriate shape for retaining the camera which it is designed to hold.

It is an object of the present invention to provide an improved camera carrying means.

Another object of the invention is to provide a camera holster which is convenient to use.

It is another object of the invention to provide a camera holster which is simple and inexpensive to manufacture.

A further object of the invention is to provide a means for both storing and carrying a camera which is inconspicuous and uncumbersome.

Other objects of the invention will become apparent to those skilled in the art from the following description, taken in connection with the accompanying drawings wherein:

FIG. 1 is an illustration of how the camera holster of the invention is utilized by an individual;

FIG. 2 is a perspective view of a camera holster constructed in accordance with the invention;

FIG. 3 is a plan view of a unitary piece of flexible material from which the camera holster of the invention is formed;

Figure 4:
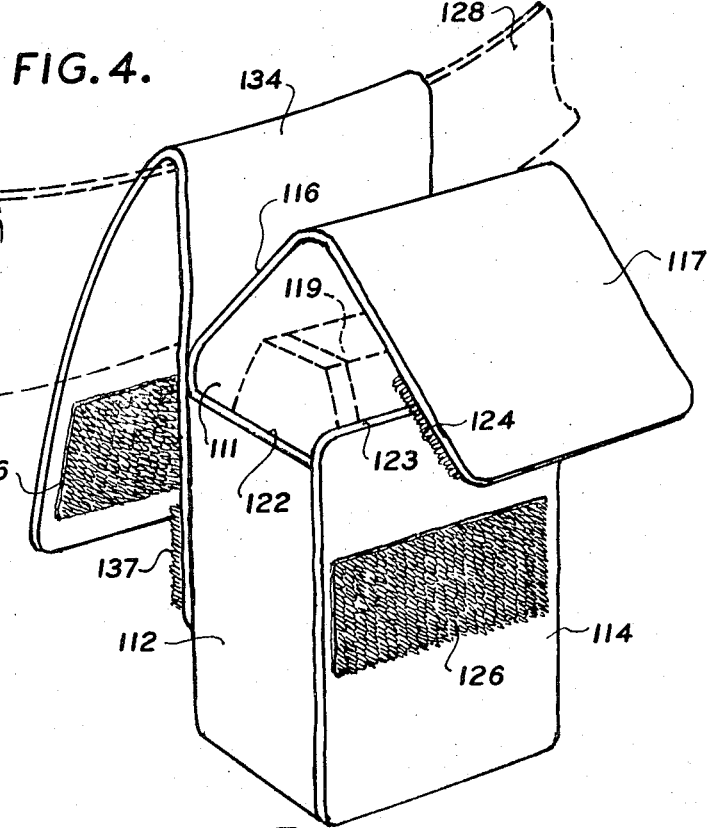
FIG. 4 is a perspective view illustrating an alternative embodiment of the invention.

Very generally, the camera holster 10 of the invention comprises a back panel 11, two side panels 12 and 13, a front panel 14, a bottom panel 15, a top cover 16, and a flap 17. All of the panels and the flap are formed contiguously from a unitary piece of flexible material. The back, side, front and bottom panels are folded and secured to form a receptacle 18 corresponding in size to a camera 19 for receiving the camera. The side and front panels have upper edges 21, 22 and 23 which define an opening into the receptacle 18. The top cover extends over the opening and is of a size corresponding to the size of the opening for covering the opening. A flap foldably extends downwardly from the top cover and has first releasable securing means 24 thereon. Second releasable securing means 26 are provided on one of the panels adjacent the flap for engaging the first releasable securing means to secure the top cover over the opening. Loop means 27 are provided at the back panel for supporting the camera holster on a belt 28.

Referring now more particularly to FIG. 1, the invention is shown in use with a camera 19. A person 29 is shown having the holster 10 of the invention secured on a belt 28. The manner in which the holster is supported on the belt 28 is described in greater detail below. The holster is shown with the cover 16 in the raised position and the person 29 is shown withdrawing the camera 19 from the holster by means of a wrist loop 31 attached to the camera. Obviously, any other suitable means of withdrawing the camera from the holster may be used at the convenience of the person.

Referring now to FIG. 2, a preferred embodiment of the invention may be seen. The back panel 11, the two side panels 12 and 13, the front panel 14, and the bottom panel 15, are all formed to define the receptacle 18 for receiving the camera. Suitable padding, not illustrated, may be placed inside the receptacle for providing additional protection for the camera. The shape of the receptacle thus defined is that of a rectangular parallelepiped, but the shape may vary depending upon the particular camera to be enclosed. The loop panel 27 extends from the bottom panel 15 alongside the back panel 11. An extension 32 extends upwardly from the back panel and has a generally horizontal slot 33 provided therein at about the level of the top edges 21, 22 and 23 of the panels 12, 13 and 14, respectively. The top cover 16 is passed through the slot 33 to extend over the opening. The loop panel 27 thereby defines, with the back panel 11, a slot or loop through which the belt 28 may be passed in order to secure the holster on the belt as shown in FIG. 1.

In order to secure the top cover 16 in place over the opening defined by the top edges 21, 22 and 23, the underside of the flap 17 is provided with an adhesive strip, preferably one which is repeatedly releasable over long periods of use, such as that material obtainable under the trade name VELCRO. The strip 24 is placed to mate with a corresponding strip 26 mounted on the front panel 14. Accordingly, when the cover is placed over the opening at the top of the receptacle 18, and when the flap 17 is folded down and pressed against the front panel 14, the mating mutually adhesive strips 24 and 26 secure the top cover in place. Alternative means of securing the top cover in place, such as a snap closure or button type device may also be used.

Referring now to FIG. 3, the manner in which the holster illustrated in FIG. 2 is manufactured may be seen. Various parts in FIG. 2 are illustrated in FIG. 3 and it may be seen that all of the panels and the flap are formed contiguously from a unitary piece of flexible material. The material may be any suitable material such as leather or vinyl and is shaped generally in the form of an L. The side panels and the back panel form one appendage of the L and the bottom panel, loop panel, top cover and flap form the other appendage of the L with the junction of the two appendages being in the front panel.

The flat piece illustrated in FIG. 3 is assembled into the holster illustrated in FIG. 2 by folding at the junctions between the side panels and the back and front panels and the bottom panel, and suitable stitching may be provided at the separated edges of the panels to provide integrity for the holster. To facilitate the stitching, extra flaps 11a and 14a may be provided along the bottom of the back panel and the side of the front panel, respectively, to provide a slight overlap. The loop panel is then folded upwardly against the back panel, and the top cover and fold flap are passed through the slot 33, resulting in a configuration such as that shown in FIG. 2.

With the continuous back-to-front looping of the loop panel 27, top cover 16 and flap 17, the loop panel and the back panel 12 form a belt slot. The size is sufficient to accommodate nearly any belt size, and the belt may be inserted through the slot, or the slot may be formed around the belt at the user's convenience. Moreover, the described configuration is fail-safe in that it is impossible for the holster to pitch forward in the event the strips 24 and 26 separate because the top cover 16 passes through the slot 33.

Referring now to FIG. 4, an alternative embodiment of the invention may be seen. In the embodiment of FIG. 4, rather than utilizing a loop panel which is contiguous with the single piece out of which the holster is formed, a separate piece, indicated at 134, is utilized. The remaining parts of the holster of FIG. 4 have been given reference numbers identical with the corresponding parts of the holster of FIGS. 2 and 3, preceded by a 1.

The single piece out of which the holster of FIG. 4 is made is similar to that shown in FIG. 3 with the exception that the shape of the unitary piece is appropriately modified. To this end, the shape is identical with that of FIG. 3 except that the loop panel, top cover and flap do not extend from the bottom panel, as shown in FIG. 3, but rather extend from the top edge of the back panel in place of the extension 32. Suitable mutually adhesive strips 136 and 137 are provided on the interior surface of the folded over loop panel 134 to enable the holster to be secured to a belt.

Figure 5:
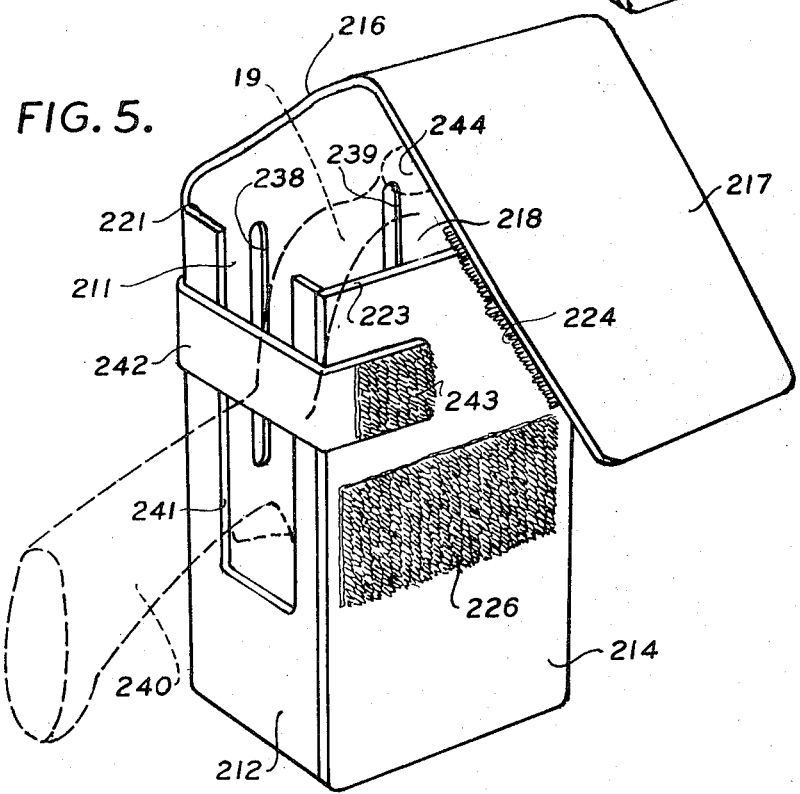
FIG. 5 is a perspective view illustrating a further alternative embodiment of the invention.

Referring now to FIG. 5, a further embodiment of the invention is illustrated. In FIG. 5, the construction is similar to that of the embodiments of FIGS. 2 and 4, and parts corresponding to the parts of the embodiment of FIG. 2 have been given identical reference numbers in FIG. 5, preceded by a 2. Thus, the back panel 211 of FIG. 5 is provided with a pair of vertical slots 238 and 239 therein, thereby providing the loop means through which the belt is threaded for supporting the camera holster.

A further modification illustrated in the embodiment of FIG. 5 is that the side panel 212 is provided with a vertical slot 241 therein for accommodating a pistol grip 240 on a camera, such as is commonly found on many movie cameras. To secure the camera in the receptacle 218, in the presence of the slot 241, a strip 242 extends from the back panel 211 and is of sufficient length to extend across the slot 241 and fold at least partially across the front panel 214. A pair of mutually adhesive strips 243 and 244 are provided on the free end of the strip 242 and the underside of the flap 217, respectively. When the flap is secured against the front panel 214, the mutually adhesive strips 243 and 244 mate, thus securing the strip 242 across the slot 241. The pistol grip can extend through the slot 241 in the space between the lower end of the slot and the strap 242. Thus, the camera is held securely in place in the receptacle 218. If desired, the strips 244 and 224 may be replaced by a single strip of sufficient size.

It may therefore be seen that the invention provides an improved means for carrying a camera and, more particularly, provides a camera holster which is of simple construction and of a high degree of utility. If desired, pouches may be placed on the side panels for carrying accessories, and an expanding bellows may be provided on the front panel for accommodating large lenses, without departing from the scope of the invention.

Various modifications of the invention in addition to those shown and described herein will become apparent to those skilled in the art from the foregoing description and accompanying drawings. Such modifications are intended to fall within the scope of the appended claims.

What is claimed is:

1. A camera holster comprising, a back panel, two side panels, a front panel, a bottom panel, a loop panel, a top cover, and a flap, all of said panels and said flap being formed contiguously from a unitary L-shaped piece of flexible material, said front panel comprising the juncture of the two appendages of the L with said side panels and back panel comprising one appendage and said bottom panel, said loop panel, said cover, and said flap, comprising the other appendate of the L-shaped piece, said back, side, front and bottom panels being folded and secured to form a receptacle corresponding in size to a camera for receiving same, said side and front panels having upper edges defining an opening into said receptacle, said loop panel extending coextensive with said back panel to define a loop for supporting said camera holster on a belt, said back panel having an extension projecting above the level of said upper edges of said side and front panels, a horizontal slot formed in said extension, said top cover passing through said horizontal slot to extend over said opening and being of a size corresponding to the size of said opening for covering same, said flap foldably extending downwardly from said top cover and having first releasable securing means thereon, second releasable securing means on said front panel adjacent said flap for engaging said first releasable securing means to secure said top cover over said opening.

2. A camera holster comprising, a unitary back panel, two side panels, a front panel, a bottom panel, a top cover, and a flap, all of said panels and said flap being formed contiguously from a unitary piece of flexible material, said back, side, front and bottom panels being folded and secured to form a receptacle corresponding in size to a camera for receiving same, said side and front panels having upper edges defining an opening into said receptacle, said top cover extending over said opening and being of a size corresponding to the size of said opening for covering same, said flap foldably extending downwardly from said top cover and having first releasable securing means thereon, second releasable securing means on one of said panels adjacent said flap for engaging said first releasable securing means to secure said top cover over said opening, a loop panel joining said top cover to said bottom panel, said back panel including an extension projecting above the level of said upper edges of said side and front panels, a horizontal slot in said extension through which said top cover is passed to secure said loop panel adjacent to and coextensive with said back panel for supporting said camera holster on a belt.

* * * * *